(12) United States Patent
Suzuki (10) Patent No.: US 6,983,974 B2
(45) Date of Patent: Jan. 10, 2006

(54) WINDSCREEN DEVICE FOR MOTORCYCLE

(75) Inventor: Yasuhito Suzuki, Shizuoka-ken (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 11/060,175

(22) Filed: Feb. 17, 2005

(65) Prior Publication Data

US 2005/0146154 A1 Jul. 7, 2005

Related U.S. Application Data

(63) Continuation of application No. 10/705,684, filed on Nov. 10, 2003.

(30) Foreign Application Priority Data

Nov. 11, 2002 (JP) .............................. 2002-327183

(51) Int. Cl.
*B62J 23/00* (2006.01)

(52) U.S. Cl. ...................... 296/78.1; 296/84.1; 296/90; 296/96.21

(58) Field of Classification Search ............... 296/77.1, 296/78.1, 84.1, 90, 96.21
See application file for complete search history.

(56) References Cited

U.S. PATENT DOCUMENTS 4,019,774 A    4/1977   Tsukahara et al. ......... 296/78.1
4,027,914 A    6/1977   Yamamoto et al.
4,632,448 A   12/1986   Yagasaki et al.
4,707,017 A   11/1987   Minobe et al.
4,790,555 A   12/1988   Nobile ....................... 296/78.1
4,830,423 A    5/1989   Nebu et al.
5,658,035 A    8/1997   Armstrong
5,732,965 A    3/1998   Willey ....................... 296/78.1
5,845,955 A   12/1998   Willey ....................... 296/78.1
6,176,538 B1   1/2001   Lawson et al.
6,254,166 B1   7/2001   Willey
6,543,831 B2   4/2003   Takemura et al. ......... 296/78.1
6,736,441 B1   5/2004   Barber et al. ............ 296/96.21
2002/0041107 A1  4/2002  Takemura et al.
2004/0061350 A1  4/2004  Yoshida et al. ............ 296/78.1

FOREIGN PATENT DOCUMENTS

JP       05-254471      10/1993
JP       08-258772      10/1996
WO       WO 97/42070    11/1997

Primary Examiner—Lori L. Coletta
(74) Attorney, Agent, or Firm—Hogan & Hartson, LLP (57) ABSTRACT

A windscreen attaching/detaching device includes a mount bracket including a stopper and a hook, with the mount bracket secured to a windscreen and a mount stay including a damper member and a lock mechanism, with the mount stay secured to a vehicle body. The lock mechanism urges the hook to a locked position. The lock mechanism includes an arm disengaging with the hook and a lever linking to the arm and turnable between the locked position and an unlocked position. The windscreen engages the damper member with the stopper as well as engages the arm with the hook to turn the lever to the locked position that allows the windscreen to be secured to the vehicle body.

8 Claims, 8 Drawing Sheets

WINDSCREEN DEVICE FOR MOTORCYCLE

This is a continuation of application Ser. No. 10/705,684 filed Nov. 10, 2003, which application is hereby incorporated by reference in its entirety.

BACKGROUND OF THE INVENTION

1. Field of the Invention

This invention relates to a windscreen device for a motorcycle with the windscreen removably attached to a vehicle body so as to cover the front of a rider.

2. Description of Related Art

Some motorcycles include a windscreen disposed in front of a rider to block headwinds. A conventional windscreen, attached to the vehicle body, is generally secured to steering handlebars through brackets with bolts or secured to a headlight through brackets with bolts.

A demand has been made for motorcycles provided with a removable windscreen such that a rider can attach or detach the windscreen depending on highway driving or local street driving, or on the rider's preference. However, attaching and detaching the windscreen was not sufficiently taken into consideration in the conventional windscreen device. Attaching and detaching the windscreen involves the cumbersome task of securing or loosening bolts by means of tools in order to attach or detach the windscreen.

An advantage of the present invention made in view of the situations with the prior art described above is to provide a windscreen device for a motorcycle in which the windscreen can be easily attached or detached without tools.

SUMMARY OF THE INVENTION

According to one embodiment of the present invention, a windscreen device for a motorcycle having a windscreen removably attached to a vehicle body so as to cover the front of a rider, includes a damper member provided on one of the vehicle body and the windscreen, a stopper engageable with the damper member provided on the other one, a hook attached to one of the vehicle body and the windscreen, a lock mechanism for urging the hook to a locked position provided on the other one, and an arm disengageably engaged with the hook, and a lever linking to the arm and turnable between a locked position and an unlocked position. The windscreen engages the damper member with the stopper as well as engages the arm with the hook to turn the lever to the locked position allowing the windscreen to be secured to the vehicle body.

According to the present invention, the arm is urged toward the locked position by a spring.

According to the present invention, the lever is provided with a key cylinder for securing the lever to the locked position.

Further according to the present invention, a key into the key cylinder also serves as a main key for a main switch disposed on the vehicle body.

In the windscreen device of the present invention, the windscreen is attached to the vehicle body by engaging the stopper with the damper member, and engaging the arm with the hook to turn the lever to the locked position. This allows the damper member and the stopper to be securely engaged with each other using a tensile force produced by the lock mechanism so that the windscreen is secured to the vehicle body. The windscreen is removed by turning the lever from the locked position to the unlocked position to release the arm from the hook.

According to the present invention, the windscreen can be attached to or detached from the vehicle body through simple work without tools, that is, turning the lever between the locked position and the unlocked position.

Also, according to the present invention, the arm urged toward the locked position by the spring allows the windscreen to be further tightly secured to the vehicle body. This can prevent a windscreen rattle and vibration while driving.

Further, the key cylinder is disposed for securing the lever to the locked position. This can prevent the windscreen from being tampered and stolen.

Also, the key to the key cylinder also serves as a main key for the main switch. There is thus no need for an extra key.

DETAILED DESCRIPTION OF THE PREFERRED EMBODIMENTS

The embodiments of the present invention will be hereinafter described in reference to the appended drawings.

Figure 1:
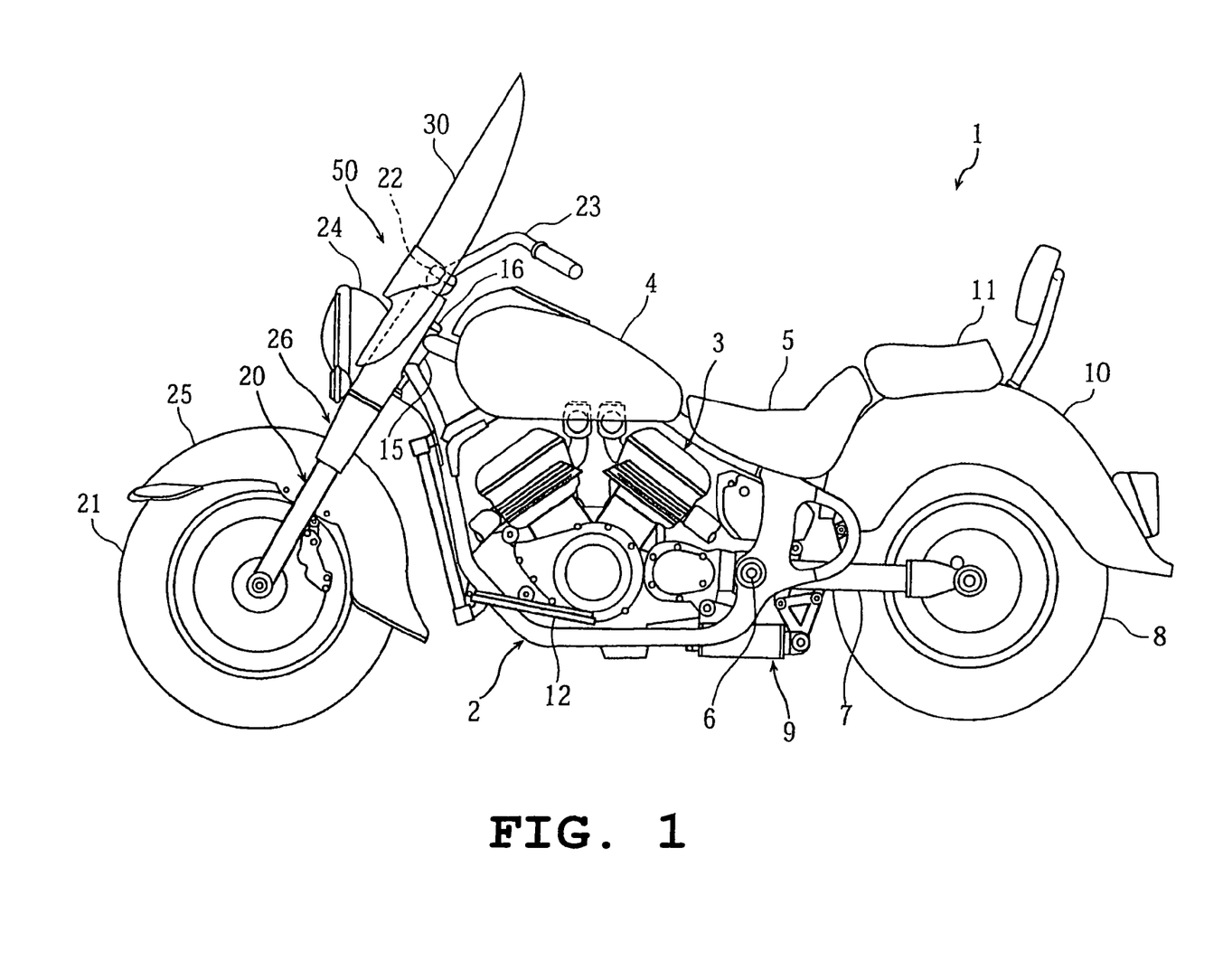
FIG. 1 is a side view of a motorcycle provided with a windscreen device according to an embodiment of the present invention.
Figure 2:
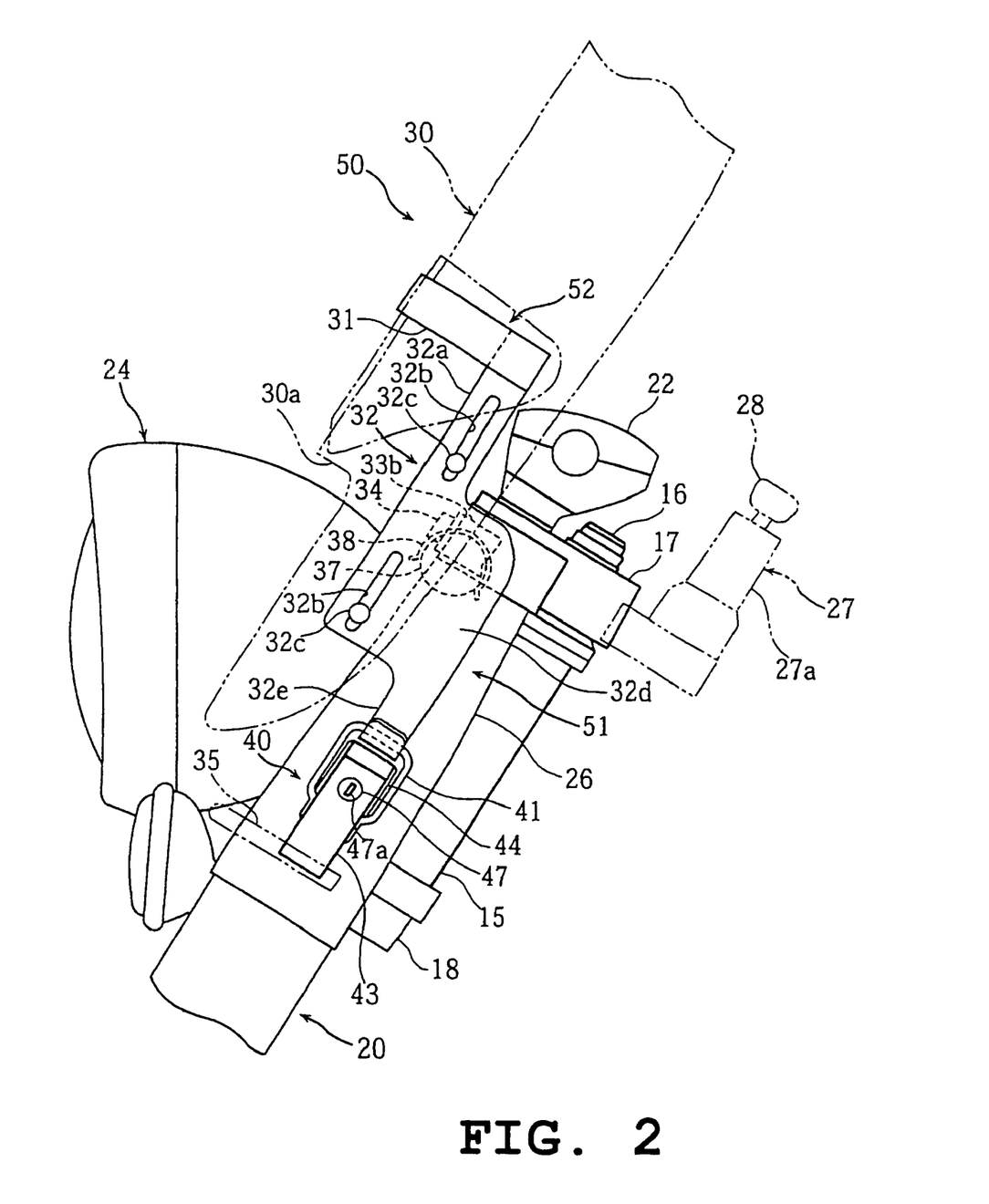
FIG. 2 is a side view of the windscreen device.
Figure 3:
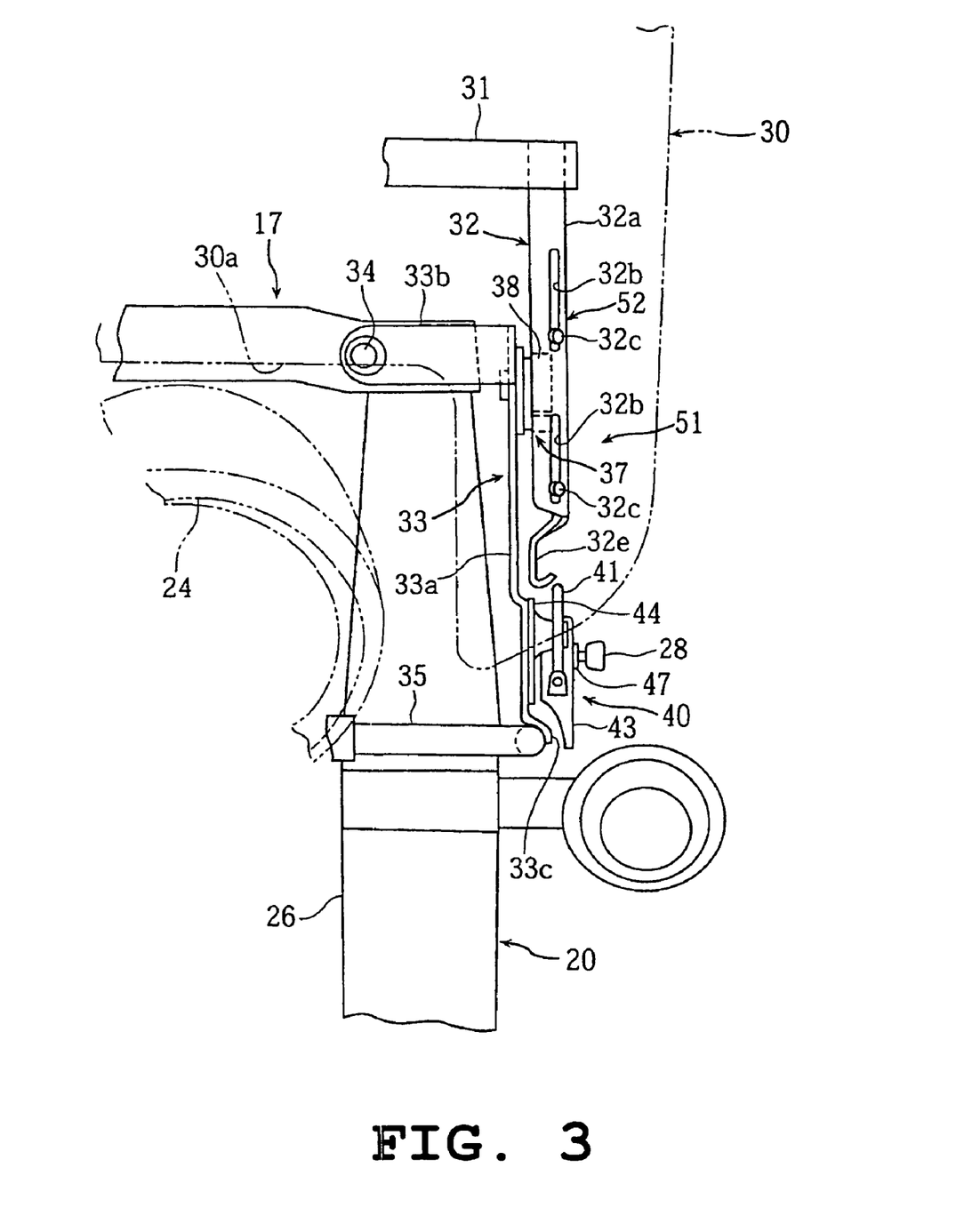
FIG. 3 is a front view of the windscreen device.
Figure 4:
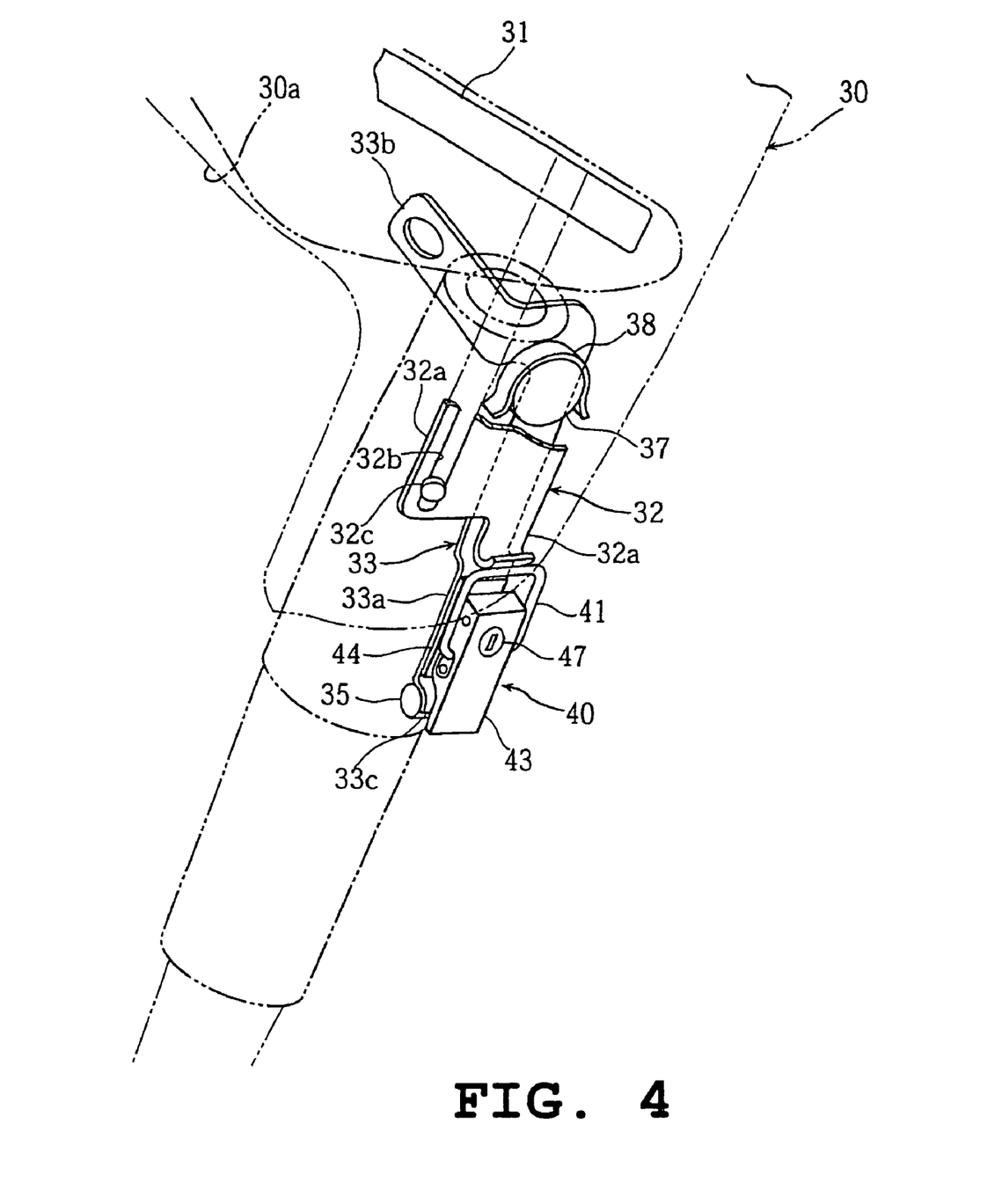
FIG. 4 is a perspective view of the windscreen device.
Figure 5:
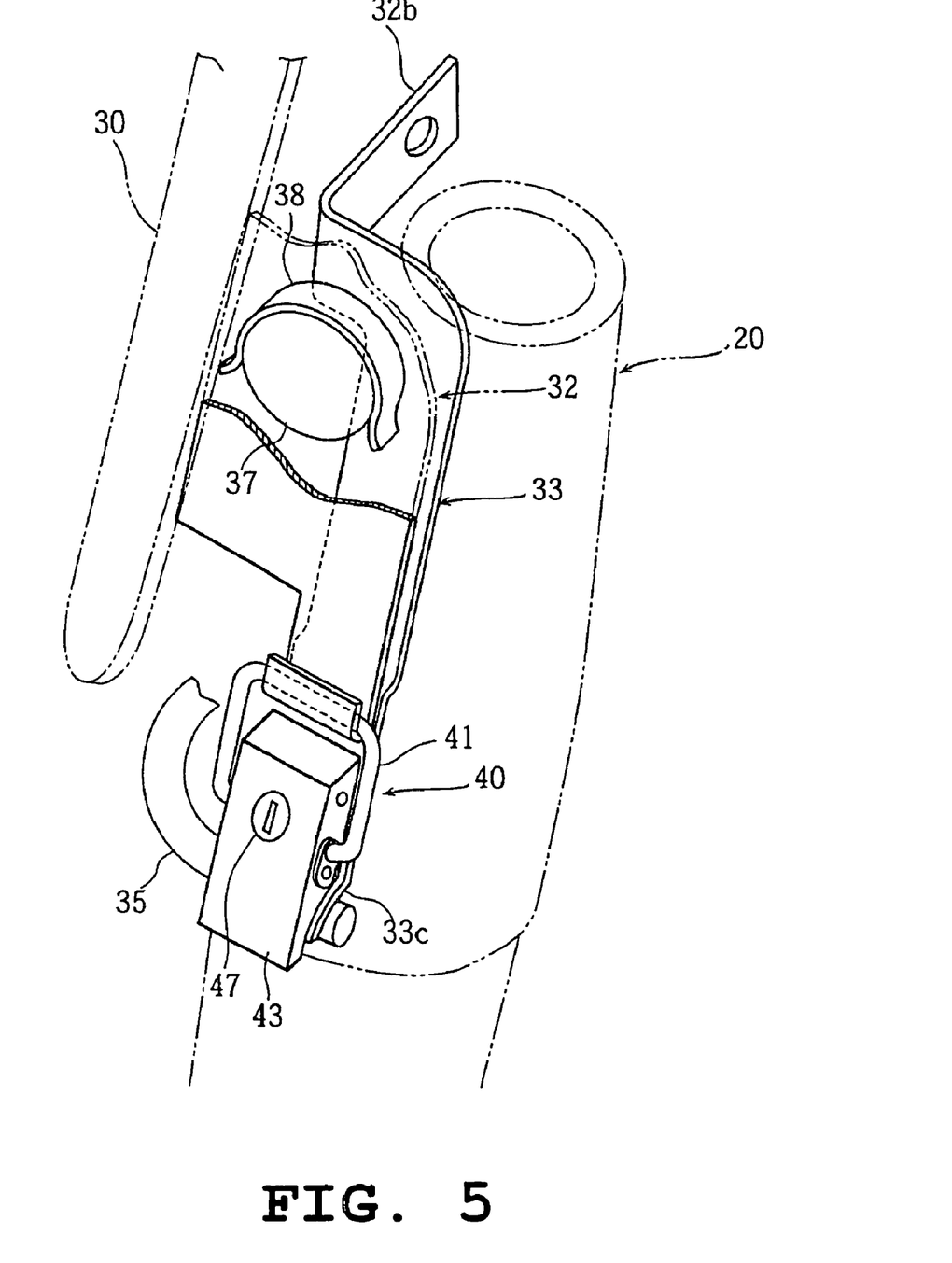
FIG. 5 is a perspective view of the windscreen device.
Figure 6:
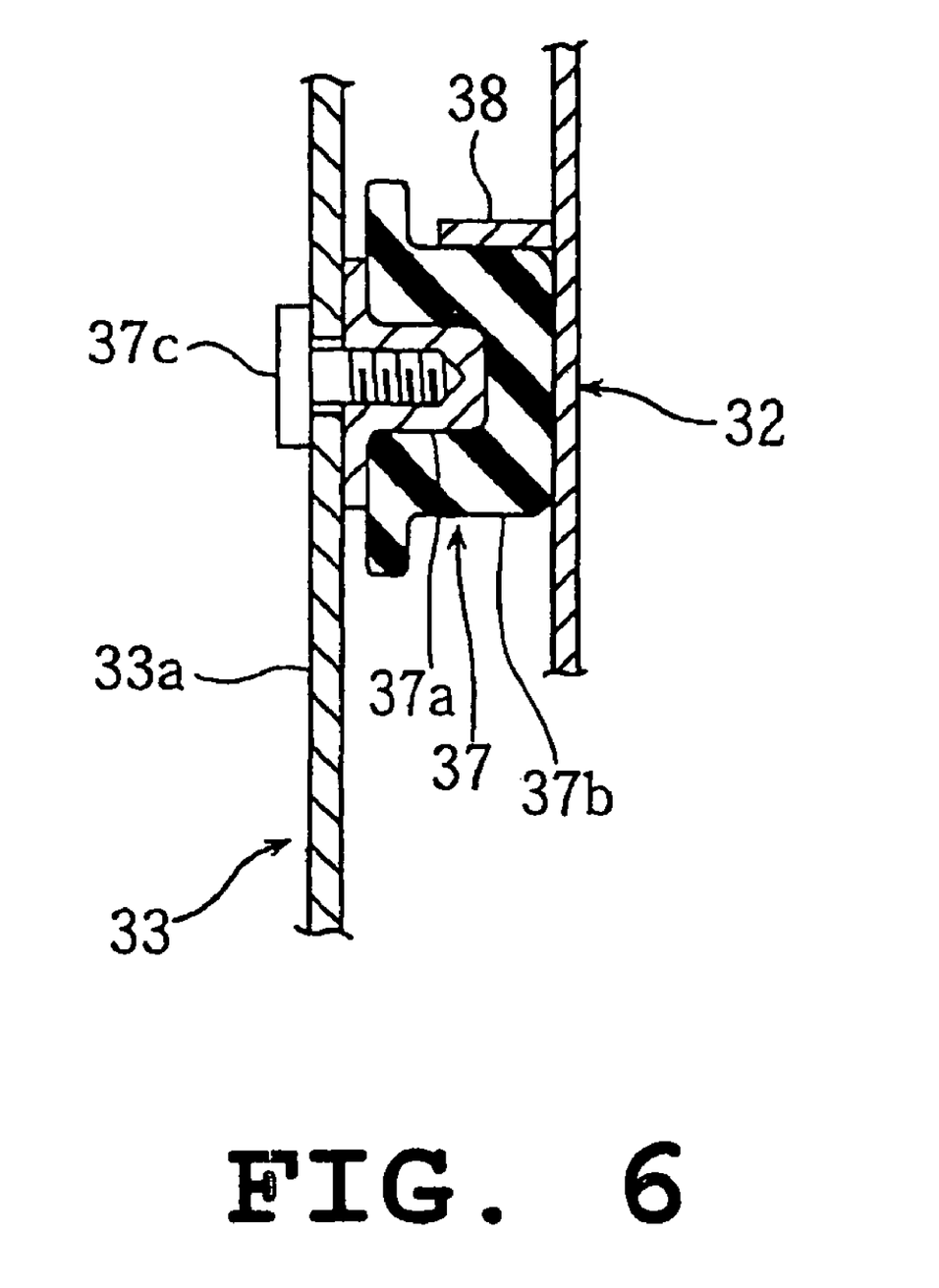
FIG. 6 is a sectional view of a boss member of the windscreen device.
Figure 7:
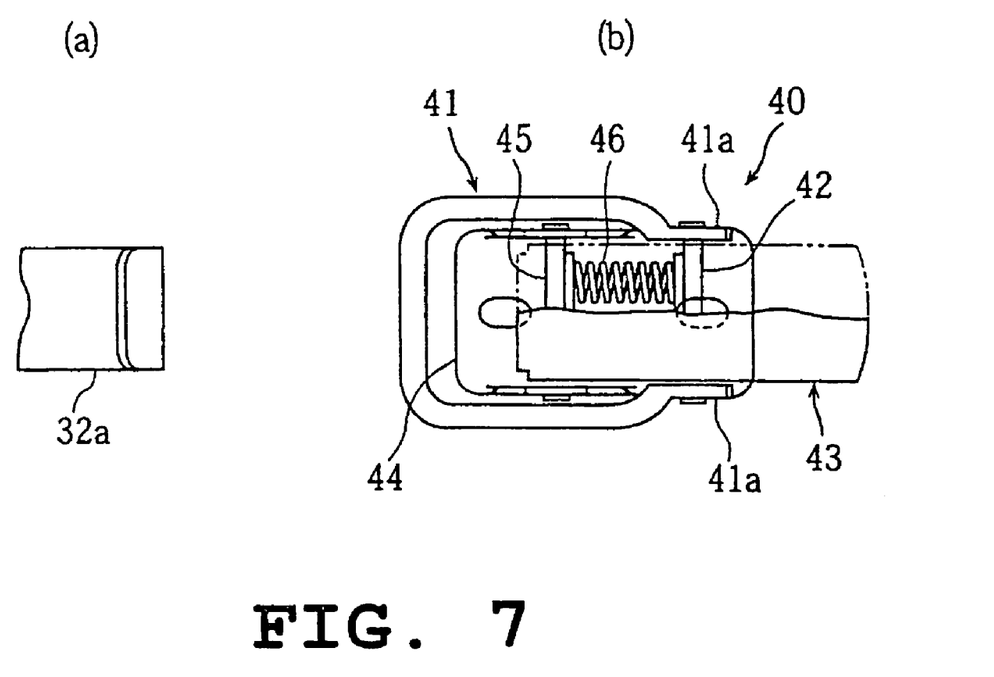
FIG. 7 are views showing a hook and a lock mechanism of the windscreen device.
Figure 8:
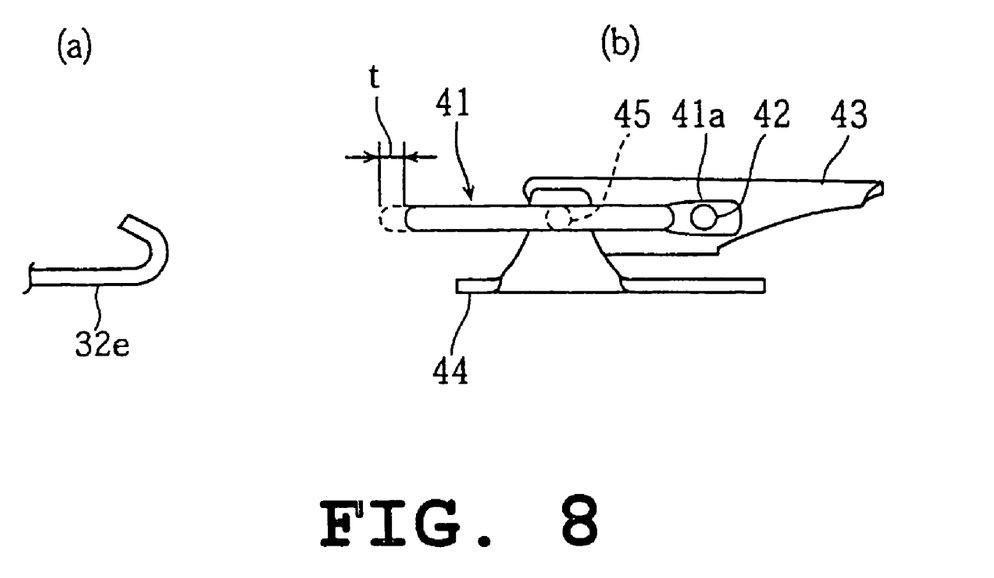
FIG. 8 are views showing the hook and the lock mechanism.

FIGS. 1 through 8 are explanatory drawings of a windscreen device for a motorcycle according to an embodiment of the present invention. FIG. 1 is a side view of a motorcycle provided with the windscreen device. FIGS. 2 and 3 are a side view and a front view of the windscreen device, respectively. FIGS. 4 and 5 are perspective views of the windscreen device. FIG. 6 is a sectional view of a rubber damper of the windscreen device. FIGS. 7(a) and 7(b) are plan views of a hook and a lock mechanism, respectively. FIGS. 8(a) and 8(b) are side views of the hook and the lock mechanism, respectively.

In the drawings, reference numeral 1 denotes the motorcycle. This motorcycle is constituted, in rough description, with a water-cooled 4-cycle V4-cylinder engine 3 mounted on a double-cradle body frame 2, and a fuel tank 4 as well as a seat 5 disposed on the upper portion of the body frame 2.

At the lower rear end of the body frame 2, a pair of left and right rear arms 7 are pivotably supported with a pivot shaft 6 for upward and downward swing. A rear wheel 8 is supported between the rear ends of the rear arms 7.

A drive shaft (not shown) for transmitting the engine power to the rear wheel 8 is fitted in the rear arms 7. A rear suspension 9 is suspended between the rear arms 7 and the body frame 2.

A rear fender 10 is provided above the rear wheel 8. A rear seat 11 is provided above the rear fender 10. The body frame 2 has footrest boards 12 which allow the rider to rest his/her feet at its left and right lower ends below the fuel tank 4.

A head pipe 15 is connected to the front end of the body frame 2. The head pipe 15 is provided with a steering shaft 16 rotatable via a bearing (not shown). The steering shaft 16 has an upper bracket 17 and an under bracket 18 tightly secured to its upper and lower ends, respectively. A pair of left and right front forks 20 are fixedly connected to both the brackets 17 and 18. A front wheel 21 is supported between the bottom ends of the front forks 20.

To the upper bracket 17 is secured a pair of left and right handle crowns 22 via interposed rubber bushes (not shown). Steering handlebars 23 are fixed to each handle crown 22 with bolts. The left and right front forks 20 have a headlight 24 attached to their upper ends while having a front fender 25, for covering the upper portion of the front wheel 21, attached to their lower ends.

Approximately the upper half of each front fork 20 is covered with a cylindrical fork cover 26. The fork cover 26 is fixed to the upper and under brackets 17 and 18. A main switch 27 is provided rearward of the upper bracket 17. The main switch 27 has a key cylinder 27a through which a main key 28 is inserted.

At the front end of the body frame 2, a windscreen device 50 is disposed for blocking headwinds. The windscreen device 50 has a windscreen 30 and an attachment/detachment mechanism 51 for attaching or detaching the windscreen 30 to or from the vehicle body.

The windscreen 30 made of polycarbonate is large enough to cover the front of the rider seated on the seat 5. The windscreen 30 is formed with opposite sides edges curved toward the rear of the vehicle. At the lower edge of the windscreen 30, a recess 30a is formed to avoid interfering with the headlight 24.

In the attachment/detachment mechanism 51, a lock mechanism 40 locks or unlocks a mount bracket 52 secured to the windscreen 30, and a mount stay 33 secured to the vehicle body.

In the mount bracket 52, a band-shaped horizontal plate 31 extending in the lateral direction of the vehicle is secured to the bottom of the windscreen 30, and left and right vertical plates 32, 32 extend downward along the outer side surface of each fork cover 26 from the left and right ends of the horizontal plate 31.

Each of the left and right vertical plates 32 has vertically extending holes 32b formed on its band-shaped support member vertically extending. The windshield 30 is secured to the vertical plates 32, 32 with bolts 32c inserted through the vertically extending holes 32b so that the vertical position of the windscreen 30 can be adjusted.

Each of the vertical plates 32 includes a base portion 32d integrally formed with the lower half of the support member 32a, and extending rearward. The laterally inner side of the base portion 32d is provided with a stopper 38 formed into a semi-circular band. A hook 32e is integrally formed with the lower edge of the base portion 32d to extend downward. The hook 32e is formed with its lower end curved upward and toward the outer side of the vehicle into a J-shape.

The mount stay 33 is disposed behind the vertical plates 32 of the mount bracket 52. The mount stay 33 has a fixed portion 33b integrally formed with the upper edge of a band-shaped main stay 33a vertically extending, from which the fixed portion 33b curves toward the vehicle body. The fixed portion 33b is tightly fixed to the front wall of the upper bracket 17 with a bolt 34. The main stay 33a has a lower end 33c interconnected by welding to a bar member 35, which is secured to the vehicle body.

A portion corresponding to the stopper 38 and formed on the upper part of the main stay 33a or near the mount bracket 52 is provided with a cylindrical damper member 37. As shown in FIG. 6, the damper member 37 includes a metal boss 37a and a hard rubber damper 37b fixed to the metal boss 37a, while being tightly screwed by a bolt 37c to the mount stay 33.

The lock mechanism 40 is provided on the mount stay 33 and below the hook 32e. The lock mechanism 40 includes an arm 41 disengageably engaged with the hook 32e and a lever 43 to which ends 41a, 41a of the arm 41 are swingably connected via a connecting pin 42. The lever 43 has a front end supported for turning between the locked position and the unlocked position with a turning pin 45 inserted through a base 44 which is secured to the mount stay 33 with bolts.

The arm 41 made of a bar material is curved into an approximately U-shape. The connecting pin 42 journaling the arm 41 can be moved by (t) relative to the lever 43 in the longitudinal direction (See FIG. 8(b)). A spring 46 interposed between the pins 42 and 45 urges the connecting pin 42 as well as the arm 41 toward the locked position.

A key cylinder 47 having a key insertion part 47a is disposed on the lever 43. Inserting the main key 28 for the main switch 27 into the key insertion part 47a for locking up allows the lever 43 to be fixed to the locked position. This can prevent the lever 43 from turning.

The windscreen 30 to be attached to the vehicle body is positioned from above such that each of the left and right stoppers 38 is engaged with the damper member 37, to turn the lever 43 to the unlocked position whereby the hook 32e is engaged with the arm 41 to turn the lever 43 to the locked position (See FIG. 2).

This allows the damper member 37 and the stopper 38 to be securely engaged with each other using a tensile force produced by the lock mechanism 40 so that the windscreen 30 is secured to the front forks 20. The windscreen 30 is removed by turning the lever 43 from the locked position to the unlocked position to release the arm 41 from the hook 32e, so that the windscreen 30 is removed from above.

According to the embodiment of the present invention as described above, the damper member 37 is attached to the mount stay 33 fixedly supported with the front fork 20. Also, each vertical plate 32 of the mount bracket 52 which is secured to the windscreen 30 is provided with the stopper 38, and the lock mechanism 40 is provided to allow the arm 41 to be engaged with the hook 32e of the vertical plate 32 so as to pull them downward. The windscreen 30 can be thus attached to or detached from the vehicle body with ease and without tools, that is, turning the lever 43 between the locked position and the unlocked position.

The damper member 37 including the rubber damper 37b, and the arm 41 urged toward the locked position by the spring 46 can prevent the windscreen 30 from rattling and vibrating while driving.

According to the embodiment of the present invention, the lever 43 has the key cylinder 47 disposed for securing the lever 43 to the locked position. This can prevent the windscreen from being tampered with and stolen. The key 28 into the key cylinder 47 also serves as a main key 28 for the main switch 27. There is thus no need for an extra key.

What is claimed is:

1. A device for mounting a windscreen to a vehicle, the device comprising:
   a bracket having a hooked portion secured to a portion of the windscreen; and
   a lock mechanism having a lever and an arm portion secured to a portion of the vehicle,
   wherein the arm portion of the lock mechanism engages the hooked portion of the bracket when the lever is moved to a first position to secure the windscreen to the vehicle.

2. The device of claim 1, wherein the lever is moveable between the first position and a second position.

3. The device of claim 2, wherein the arm portion of the lock mechanism disengages the hooked portion of the bracket when the lever is moved to the second position to remove the windscreen from the vehicle.

4. The device of claim 2, wherein the first position comprises a locked position, and wherein the second position comprises an unlocked position.

5. A device for mounting a windscreen to a vehicle, the device comprising:
- a bracket having a hooked portion secured to a portion of the windscreen; and
- a lock mechanism having a lever and an arm portion secured to a portion of the vehicle,
- wherein the lever is moveable between a locked position and an unlocked position,
- wherein the arm portion of the lock mechanism engages the hooked portion of the bracket when the lever is moved to the locked position to secure the windscreen to the vehicle, and
- wherein the arm portion of the lock mechanism disengages the hooked portion of the bracket when the lever is moved to an unlocked position to remove the windscreen from the vehicle.

6. A vehicle comprising:
- a frame;
- a windscreen;
- a bracket having a hooked portion mounted to the windscreen; and
- a lock mechanism having a lever and an arm portion mounted to the frame,
- wherein the arm portion of the lock mechanism engages the hooked portion of the bracket when the lever is moved to a locked position to mount the windscreen to the frame.

7. The device of claim 6, wherein the lever is moveable between the locked position and an unlocked position.

8. The device of claim 7, wherein the arm portion of the lock mechanism disengages the hooked portion of the bracket when the lever is moved to the unlocked position to remove the windscreen from the frame.

* * * * *